United States Patent [19]

Oda et al.

[11] 4,441,681
[45] Apr. 10, 1984

[54] MOUNTING APPARATUS FOR OUTSIDE REAR VIEW MIRROR ASSEMBLY

[75] Inventors: Takaaki Oda; Hidehiro Otsuka, both of Tokyo, Japan

[73] Assignee: Nissan Motor Company, Limited, Yokohama, Japan

[21] Appl. No.: 953,176

[22] Filed: Oct. 20, 1978

[30] Foreign Application Priority Data

Dec. 23, 1977 [JP] Japan .......................... 52-174849[U]

[51] Int. Cl.³ .......................... A47G 1/16; B60R 1/06
[52] U.S. Cl. ................................. 248/475.1
[58] Field of Search ................ 248/274, 288 R, 298, 248/475 R, 475 B, 476, 477, 478, 481, 482, 483, 484, 485, 486, 487; 85/80, 82

[56] References Cited

U.S. PATENT DOCUMENTS

| | | | |
|---|---|---|---|
| 1,514,867 | 11/1924 | Solasabal et al. | 248/288 R |
| 1,755,590 | 4/1930 | Carr | 85/80 |
| 1,878,821 | 9/1932 | Daugherty | 248/298 X |
| 1,978,935 | 10/1934 | Douglas | 85/80 |
| 2,259,720 | 10/1941 | Amesbury | 85/80 |
| 2,743,460 | 5/1956 | Youngstrom et al. | 248/298 X |
| 2,775,919 | 1/1957 | Fischer | 248/478 X |
| 2,949,058 | 8/1960 | Daly | 248/475 B |
| 2,956,605 | 10/1960 | Rapata | 85/80 |
| 3,593,612 | 7/1971 | Schulze | 85/80 |
| 3,933,076 | 1/1976 | Tanaka | 85/80 |

FOREIGN PATENT DOCUMENTS

| | | | |
|---|---|---|---|
| 247176 | 9/1965 | Austria | 248/481 |
| 2061078 | 6/1972 | Fed. Rep. of Germany | 85/82 |
| 2254510 | 5/1974 | Fed. Rep. of Germany | 248/482 |

*Primary Examiner*—Thomas J. Holko

[57] ABSTRACT

A mounting apparatus comprises a grommet for snap-on attachment to an aperture in an exterior vehicle body panel, a base pad to be placed on the panel and adapted to engage the grommet in such a manner to prevent the grommet from being rotated about its axis relative to the base pad, and a self-tapping screw for insertion into the grommet. By means of the apparatus, an outside rear view mirror assembly is mounted on the panel through work entirely done from the outside of the panel without damaging the paint coating of the panel around the aperture.

1 Claim, 6 Drawing Figures

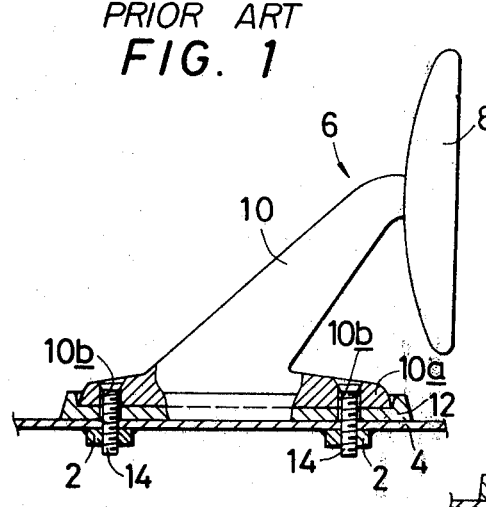
PRIOR ART
FIG. 1
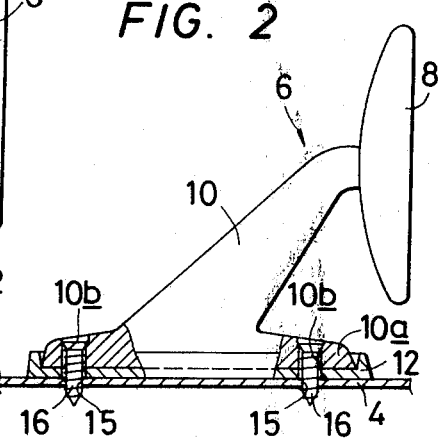
PRIOR ART
FIG. 2
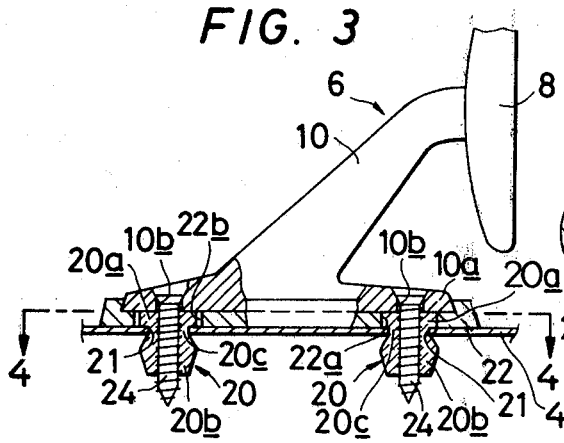
FIG. 3
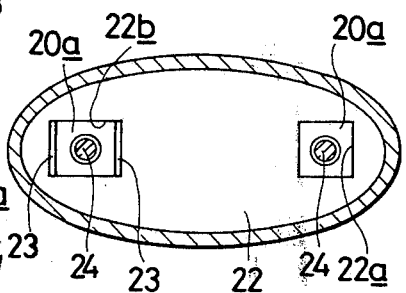
FIG. 4
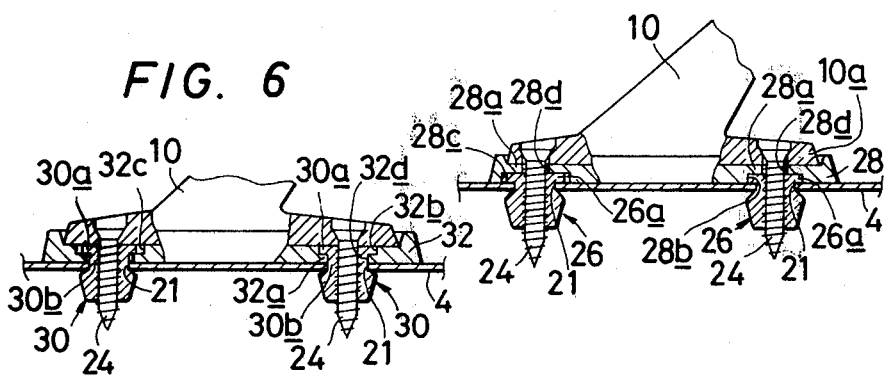
FIG. 5
FIG. 6

MOUNTING APPARATUS FOR OUTSIDE REAR VIEW MIRROR ASSEMBLY

BACKGROUND OF THE INVENTION

This invention relates to a mounting apparatus for an outside rear view mirror assembly of a vehicle such as an automotive vehicle.

There have been two types of apparatus for mounting an outside rear view mirror assembly on an exterior body panel of a vehicle proposed; one type is constructed such that the mirror assembly is mounted on the exterior body panel by means of screws, which are screwed in from the outside of the exterior body panel, and the other type is constructed such that the mirror assembly is mounted on the exterior body panel by means of nuts which are fitted from the inside of the exterior body panel. Though the former type is undesirable in that the screw heads are exposed to the weather, it is widely used owing to the fact that it is superior to the latter type in ease of mounting the mirror assembly on the exterior body panel. Two kinds of mounting apparatus which belong to the former type are known in the art; one is shown in FIG. 1 and the other in FIG. 2.

Referring to FIG. 1, one of the above two kinds of mounting apparatus is explained in connection with a mounting structure attained thereby.

This mounting apparatus includes two nuts 2 and 2 which are welded to an exterior body panel 4 of a vehicle at the inside surface thereof. Generally designated by the reference numeral 6 is an outside rear view mirror assembly of an ordinary type which includes a mirror 8 and a mirror supporting arm 10 on which the mirror 8 is pivotably supported. The mirror supporting arm 10 is provided with a base section 10a having a generally flat surface to be secured to a generally flat configured base pad 12 which is in turn to be secured to the exterior body panel 4. The mirror supporting arm 10 is attached in fixed relation to the exterior body panel 4 over the base pad 12 by means of two screws 14 and 14 which are screwed into the nuts 2 and 2 through holes 10b and 10b formed in the base section 10a, respectively.

In this mounting apparatus, the nuts 2 and 2 are required to be welded to the exterior body panel 4 prior to the process of mounting the mirror assembly 6 on the exterior body panel 4, which inevitably complicates the manufacturing process of a vehicle body. Hence, the apparatus is inapplicable to the body panel 4 unless the latter has the nuts 2 and 2 welded thereto.

Referring to FIG. 2, the other of the foregoing two kinds of mounting apparatus is explained in connection with a mounting structure attained thereby.

This mounting structure is mainly different from the mounting structure of FIG. 1 in that two screw accommodation openings 15 and 15 are formed in the exterior body panel 4 to receive self-tapping screws 16 and 16, respectively. The mirror supporting arm 10 is attached in fixed relation to the exterior body panel 4 over the base pad 12 by means of the self-tapping screws 16 and 16 which are screwed into the openings 15 and 15 through holes 10b and 10b, respectively.

This mounting apparatus has a disadvantage that the self-tapping screws 16 and 16 damage the paint coating of the body member 4 around the screw accommodation openings 15 and 15 when the self-tapping screws 16 and 16 are screwed into the openings 15 and 15, respectively. Due to this damage of the paint coating around the openings 15 and 15, the portions of the exterior body panel 4 around the openings 15 and 15 tend to rust extensively after a relatively short period of usage of this kind of mounting apparatus, and resultantly the assured mount of the mirror assembly on the body member can be possibly impaired in a relatively short period of usage.

SUMMARY OF THE INVENTION

This invention contemplates to solve the problems inherent in a conventional mounting apparatus of the described type.

It is an object of the present invention to provide a mounting apparatus for an outside rear view mirror assembly of a vehicle, which apparatus is free from the foregoing drawbacks inherent in a conventional mounting apparatus of the described type.

It is a further object of the present invention to provide a mounting apparatus for an outside rear view mirror assembly of a vehicle, which apparatus is constructed to mount the mirror assembly on an exterior vehicle body panel through work entirely done from the outside of the exterior vehicle body panel without requiring the provision of nuts which require welding to the interior surface of the vehicle exterior body panel prior to the process of mounting the mirror assembly on the exterior vehicle body panel and which apparatus is further constructed not to damage the paint coating of the exterior vehicle body panel so that the secure mounting of the mirror assembly is maintained over a long period of usage.

BRIEF DESCRIPTION OF THE DRAWINGS

These and other objects and advantages of this invention will become more apparent from the following description taken in conjunction with the accompanying drawings, in which:

FIG. 1 is a partially sectional view showing a mounting structure of an outside rear view mirror assembly attained by one conventional mounting apparatus;

FIG. 2 is a partially sectional view showing a mounting structure of an outside rear view mirror assembly attained by another conventional mounting apparatus;

FIG. 3 is a partially sectional view showing a mounting structure of an outside rear view mirror assembly attained by a first preferred embodiment of a mounting apparatus according to the present invention;

FIG. 4 is a transverse sectional view of the mounting structure according to the line 4—4 of FIG. 3, in which a mirror supporting arm incorporated in the mounting structure of FIG. 3 is omitted;

FIG. 5 is a partially sectional view showing a mounting structure of an outside rear view mirror assembly attained by a second preferred embodiment of a mounting apparatus according to the present invention; and FIG. 6 is a partially sectional view showing a mounting structure of an outside rear view mirror assembly attained by a third preferred embodiment of a mounting apparatus according to the present invention.

DESCRIPTION OF THE PREFERRED EMBODIMENTS

Preferred embodiments of a mounting apparatus for an outside rear view mirror assembly according to the present invention will be explained with reference to FIGS. 3 to 6 in which like parts of the mounting structures shown in FIGS. 1 and 2 are given the same numerals and for brevity are not described in detail twice.

Referring now to FIGS. 3 and 4, a first embodiment of a mounting apparatus for an outside rear view mirror of this invention is explained in connection with a mounting structure attained thereby.

Generally designated by the reference numerals 20 and 20 are grommets which are made of an elastically deformable material, e.g. an elastically deformable plastics or an elastically deformable synthetic resin base material. An exterior body panel 4 of a vehicle is provided with two apertures 21 and 21 which are formed at desired positions where an outside rear view mirror assembly 6 is to be mounted and which are spaced apart from each other over a distance corresponding to the distance between through holes 10b and 10b in a base section 10a of a mirror supporting arm 10. The grommets 20 and 20 are adapted to be inserted into the apertures 21 and 21 from the outside of the exterior body panel 4 and to be snap-on attached thereto through elastic deformation thereof. The grommets 20 and 20 are substantially equal both in shape and function and each of which comprises a head section 20a to be disposed on the outside of the exterior body panel 4, a leg section 20b to be disposed on the inside of the exterior body panel 4, and a neck section 20c extending between the head section 20a and the leg section 20b and adapted to be engaged in the aperture 21. The neck section 20c is of a cylindrical configuration of a diameter substantially equal to that of the aperture 21. The leg section 20c is of a bulb-like configuration with an enlarged part of a diameter larger than that of the aperture 21 and insertable from the outside of the exterior body panel 4 into the inside of same through the aperture 21 by elastic deformation of the leg section 20b per se. The head section 20a is of a non-circular configuration, e.g. a rectangular configuration as depicted in FIG. 4, for the reason that will be explained hereinlater, and adapted to cooperate with the leg section 20b to clamp therebetween the exterior body panel 4 when the grommet 20 is inserted into the aperture 21.

Designated by the reference numeral 22 is a generally flat configured base pad which is adapted to be interposed between the base section 10a of the mirror supporting arm 10 and the exterior body panel 4. The base pad 22 is formed with first and second holes 22a and 22b which are spaced apart from each other by a distance corresponding to the distance between the holes 10b and 10b in the base section 10a of the mirror supporting arm 10. The first and second holes 22a and 22b are adapted to receive therewithin the head sections 20a and 20a of the grommets 20 and 20, respectively, when the base pad 22 is placed in position on the exterior body panel to which the grommets 20 and 20 have been fitted, in such a manner as to prevent the grommets 20 and 20 from being rotated about the axis thereof relative to the base pad 22. As shown specifically in FIG. 4, the first and second holes 22a and 22b can be rectangular through holes to receive therewithin the rectangular head sections 20a and 20a, respectively. Preferably, the first hole 22a is constructed to securely receive the head section 20a and the second hole 22b is constructed to receive the head section 20a with clearances 23 and 23 between the wall of the base pad 22 defining the hole 22b and the opposed sides of the head section 20a as shown in FIG. 4. With these clearances 23 and 23, the second hole 22b receives the head section 20a in such a manner as to allow reciprocative movement of the grommet 20 toward and away from the first hole 22a. Such clearances are provided for compensating possible errors of the distances between the apertures 21 and 21 and between the first and second holes 22a and 22b. The first hole 22a can also be constructed to provide such clearances so as to provide for further compensation for the above possible errors.

Designated by the reference numerals 24 and 24 are self-tapping screws which are sized to be screwed into the grommets 20 and 20 through the holes 10b and 10b in the base section 10a of the mirror supporting arm 10, respectively.

The aforesaid apertures 21 and 21 are preferably formed in the body panel 4 prior to the process of painting the vehicle body but which may be provided after the painting process or even after assembly of the vehicle given that spot painting arround apertures is carried out thereafter.

The grommets 20 and 20, the base pad 22 and the self-tapping screws 24 and 24 thus far described constitute an apparatus for mounting an outside rear view mirror assembly on an exterior body panel of a vehicle according to the present invention.

The outside rear view mirror assembly 6 is mounted on the exterior body panel 4 by means of the mounting apparatus thus far described as follows:

The grommets 20 and 20 are first inserted into the apertures 21 and 21, respectively, from the outside of the exterior body panel 4 and snap-on attached thereto. The base pad 22 is then placed on the exterior body panel 4 with the first and second holes 22a and 22b receiving therewithin the head sections 20a and 20a of the grommets 20 and 20, respectively. After that, the mirror supporting arm 10 of the outside rear view mirror assembly 6 is attached at the base section 10a thereof to the base pad 22 and the self-tapping screws 24 and 24 are screwed into the grommets 20 and 20 through the through holes 10b and 10b in the base section 10a, respectively.

The mirror supporting arm 10 is thus held fixed relative to the exterior body panel 4 over the base pad 22.

It is to be noted that the grommets 20 and 20 are permanently fixed to the exterior body panel 4 by the action of the self-tapping screws 24 and 24 which are respectively screwed thereinto since the self-tapping screws 24 and 24 function as cores for the grommets 20 and 20 to limit the elastic deformation thereof to a lower level where the grommets 20 and 20 are prevented from being removed from the apertures 21 and 21.

It is further noted that the work of screwing the self-tapping screws 24 and 24 into the grommets 20 and 20 is done with ease since the grommets 20 and 20 are prevented from being rotated about the axis thereof relative to the base pad 22.

Referring to FIG. 5, a second embodiment of a mounting apparatus of this invention is explained.

The second embodiment is distinct from the first embodiment in that each of the grommets 26 and 26 is constructed to have a head section 26a which is thinner than the head section 20a of the grommet 20 of the first embodiment and that a base pad 28 is provided with integral tongue sections 28a and 28a each of which is located at the upper end of each of first and second holes 28b and 28c, as viewed in the drawing, so as to cover the head section 26a. The tongue sections 28a and 28a are formed with openings 28d and 28d through which the self-tapping screws 24 and 24 are to be inserted into the grommets 26 and 26, respectively.

The first and second holes 28b and 28c are constructed to receive the head sections 26a and 26a in a similar manner to the first and second holes 22a and 22b of the first embodiment.

The outside rear view mirror assembly 6 is mounted on the exterior body panel 4 by means of the second embodiment of a mounting apparatus of this invention in a similar manner as have been explained with reference to the first embodiment.

It is to be noted that, since in this second embodiment the first and second holes 28b and 28c are formed as a pocket hole, the first and second holes 28b and 28c can be formed so as to be located closer to the peripheral edge of the base pad 28 whereby the base pad can be smaller in size.

Referring to FIG. 6, a third embodiment of a mounting apparatus of this invention is explained.

The third embodiment is distinct from the first embodiment in that each of the grommets 30 and 30 is constructed to have a head section 30a which is thinner than the head section 20a of the grommet 20 of the first embodiment and a neck section 30b which is longer than the neck section 20c of the grommet 20 and a base pad 32 is provided with integral tongue sections 32a and 32a each of which is located at the lower end of each of first and second holes 32b and 32c, as viewed in the drawing, so as to provide a shoulder upon which the head section 30a rests. The tongue sections 32a and 32a are formed with openings 32d and 32d each of which is sized to accommodate therewithin a part of the neck section 30b.

These modifications are made such that the base pad 32 is held fixed relative to the exterior body panel 4 by means of the grommets which are inserted into the apertures 21 and 21 in the exterior body panel 4 through openings 32d and 32d in the base pad 32, respectively.

The first and second holes 32b and 32c are constructed to receive the head sections 30a and 30a in a similar manner to the first and second holes 22a and 22b of the base pad 22 of the first embodiment.

The outside rear view mirror assembly 6 is mounted on the exterior body panel 4 by means of the third embodiment of a mounting apparatus of this invention as follows:

The base pad 32 is first placed on the exterior body panel 4 with the first and second holes 32b and 32c aligned with the apertures 21 and 21. The grommets 30 and 30 are then inserted into the apertures 21 and 21 through the openings 32d and 32d in the base pad 32, respectively. The base pad 32 is thus held fixed relative to the exterior body panel 4. After that, the mirror supporting arm 10 of the outside rear view mirror assembly 6 is attached at the base section 10a thereof to the base pad 32 and the self-tapping screws 24 and 24 are screwed into the grommets 30 and 30 through the holes 10b and 10b in the base section 10a of the mirror supporting arm 10, respectively.

The mirror supporting arm 10 is thus held fixed relative to the exterior body panel 4 over the base pad 32.

In this third embodiment, it is to be noted that the base pad 32 is prevented from slipping off the exterior body panel 4 by the action of the grommets 30 and 30 even when the exterior body panel is slanted considerably, which results in ease in attaching the mirror supporting arm 10 onto the base pad 32.

From the description thus far made, it is to be noted that by means of a mounting apparatus according to the present invention an outside rear view mirror assembly can be mounted on an exterior body panel of a vehicle through work entirely done from the outside of the exterior body panel.

It is further to be noted that by means of a mounting apparatus according to the present invention an outside rear view mirror assembly can be mounted on an exterior body panel of a vehicle not only after painting of a vehicle body has been completed but also after assembly of the vehicle has been completed, without damaging the paint coating around apertures in the exterior body panel for the use of mounting the mirror assembly, provided that the exterior body panel is formed with the apertures, preferably formed prior to the process of painting the vehicle body but which may be provided after the painting process given that spot painting around the apertures is carried out thereafter.

It is further to be noted that according to the present invention a self-tapping screw for use in mounting an outside rear view mirror assembly on an exterior body panel of a vehicle is screwed into a grommet and does not engage an aperture in the exterior body panel directly, thus preventing the paint coating around the aperture from being damaged so that the assured mount of the mirror assembly is maintained over a long period of usage of the mounting apparatus.

Although a mounting apparatus for an outside rear view mirror assembly of this invention has thus far been described and shown as an application to the mirror assembly of the type which is provided with two holes for use of its mounting, it can be applied to the mirror assembly of the type which is provided with any number of holes for use of its mounting within the teachings of this invention.

What is claimed is:

1. In a vehicle having an exterior body panel formed with a pair of apertures and an outside rear view mirror assembly having a mirror supporting arm formed with a pair of screw accommodation openings which are capable of being coaxially aligned with the apertures in the exterior body panel, respectively, an apparatus for mounting the outside rear view mirror assembly on the exterior body panel, comprising:

a base pad having a lower surface where it is mounted on the exterior body panel and an upper surface where it carries thereon the mirror supporting arm in such a manner that the apertures in the exterior body panel are coaxially aligned with the openings in the mirror supporting arm, respectively, said base pad being formed with a pair of non-circular holes which are coaxially aligned with the apertures in the exterior body panel, respectively;

two elastic grommets respectively inserted into the apertures in the exterior body panel and temporarily mounted therein with the elastic deformability of the grommets, each of the grommets having a leg section disposed on the inside of the exterior body panel, a non-circular head section received within one of the holes in the base pad in such a manner as to be prevented from rotation about the axis thereof relative to the base pad, and a neck section extending, through one of the apertures in the exterior body panel, between the head section and the leg section;

two self-tapping screws in engagement with the mirror supporting arm, extending through the openings of the mirror supporting arm and screwed into the grommets such that the grommets are reduced in elastic deformability and thereby permanently mounted in the exterior body panel and that the mirror supporting arm is drawn against the grommets thereby to be fixedly held against the exterior body panel by way of the base pad; and in which said base pad further comprises a pair of tongue sections at the respective axial end of its holes immediately adjacent the lower surface thereof, each of said tongue sections having an opening which is so formed as to accommodate a part of the neck section of each of the grommets and to provide a shoulder upon which the head section of each of the grommets rests such that the base pad and the exterior body panel are temporarily fastened together by being clamped between the head section and the leg section of each of the grommets prior to the fitting of the self-tapping screws into the respective grommets.

* * * * *